United States Patent
Murai et al.

(10) Patent No.: US 7,126,054 B2
(45) Date of Patent: Oct. 24, 2006

(54) RAW MATERIAL KIT FOR ELECTROLYTIC COMPOSITION, ELECTROLYTIC COMPOSITION, AND DYE-SENSITIZED SOLAR CELL

(75) Inventors: Shinji Murai, Yokohama (JP); Hiroyasu Sumino, Tokyo (JP); Satoshi Mikoshiba, Yamato (JP); Shuji Hayase, Kitakyushu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 312 days.

(21) Appl. No.: 10/180,018

(22) Filed: Jun. 27, 2002

(65) Prior Publication Data

US 2003/0127130 A1 Jul. 10, 2003

(30) Foreign Application Priority Data

Jun. 28, 2001 (JP) .............................. 2001-197052

(51) Int. Cl.
*H01L 31/04* (2006.01)
(52) U.S. Cl. .................... 136/263; 136/252; 136/256; 257/40; 257/43; 257/431
(58) Field of Classification Search ................ 136/263, 136/252, 256; 257/40, 43, 431
See application file for complete search history.

(56) References Cited

U.S. PATENT DOCUMENTS

| | | | | |
|---|---|---|---|---|
| 3,396,136 | A * | 8/1968 | Dickerson | 524/143 |
| 6,245,458 | B1 * | 6/2001 | Sotomura | 429/213 |
| 6,350,946 | B1 * | 2/2002 | Miyake et al. | 136/252 |
| 6,384,321 | B1 | 5/2002 | Mikoshiba et al. | 136/263 |
| 6,686,095 | B1 * | 2/2004 | Hayase et al. | 429/300 |
| 2003/0164188 | A1 * | 9/2003 | Murai et al. | 136/263 |
| 2004/0025933 | A1 * | 2/2004 | Chittibabu et al. | 136/263 |
| 2004/0211461 | A1 * | 10/2004 | Murai et al. | 136/263 |

FOREIGN PATENT DOCUMENTS

JP 1-220380 A 9/1989

OTHER PUBLICATIONS

U.S. Appl. No. 60/368,832, filed Mar. 29, 2002.*
Wataru Kubo, et al., "Fabrication of Quasi-Solid-State Dye-Sensitized TiO$_2$ Solar Cells Using Low Molecular Weight Gelators", Chemistry Letters, 1998, pp. 1241-1242.
Masamitsu Matsumoto, et al., "Fabricatin of Solid-State Dye-Sensitized TiO$_2$ Solar Cell Using Polymer Electrolyte", Bull. Chem. Soc. Jpn., 2001, vol. 74, pp. 387-393.
Fei Cao, et al., "A Solid State, Dye Sensitized Photoelectrochemical Cell", J. Phys. Chem., 1995, vol. 99, pp. 17071-17073.
U.S. Appl. No. 10/180,018, filed Jun. 27, 2002, Murai, et al.
U.S. Appl. No. 11/389,213, filed Mar. 27, 2006, Murai, et al.

* cited by examiner

*Primary Examiner*—Alan Diamond
(74) *Attorney, Agent, or Firm*—Oblon, Spivak, McClelland, Maier & Neustadt, P.C.

(57) ABSTRACT

Disclosed is a dye-sensitized solar cell comprising a gel electrolyte that contains a gelling agent and an electrolyte, wherein the gelling agent contains at least one kind of a polymer selected from the group consisting of a first polymer in which polysulfonic acid is crosslinked by a metal ion having a valency of not less than two, a second polymer in which polycarboxylic acid is crosslinked by a metal ion having a valency of not less than two, a third polymer in which a quaternary ammonium salt of polysulfonic acid is crosslinked by a metal ion having a valency of not less than two and a fourth polymer in which a quaternary ammonium salt of polycarboxylic acid is crosslinked by a metal ion having a valency of not less than two.

9 Claims, 2 Drawing Sheets

RAW MATERIAL KIT FOR ELECTROLYTIC COMPOSITION, ELECTROLYTIC COMPOSITION, AND DYE-SENSITIZED SOLAR CELL

CROSS-REFERENCE TO RELATED APPLICATIONS

This application is based upon and claims the benefit of priority from the prior Japanese Patent Application No. 2001-197052, filed Jun. 28, 2001, the entire contents of which are incorporated herein by reference.

BACKGROUND OF THE INVENTION

1. Field of the Invention

The present invention relates to a raw material kit for an electrolytic composition, an electrolytic composition obtained from the raw material kit for an electrolytic composition, and a dye-sensitized solar cell using the electrolytic composition.

2. Description of the Related Art

The general construction of a dye-sensitized solar cell is described in, for example, Jpn. Pat. Appln. KOKAI Publication No. 1-220380. As described in the prior art quoted above, the solar cell comprises an oxide electrode including a transparent semiconductor layer containing fine particles of a metal oxide and a dye supported on the surface of the transparent semiconductor layer, a transparent electrode arranged to face the oxide electrode, and a liquid carrier movement layer interposed between the two electrodes noted above. The solar cell of the particular construction is called a wet type dye-sensitized solar cell because the carrier movement layer is a liquid.

The dye-sensitized solar cell outlined above is operated as follows. Specifically, the light incident on the transparent electrode runs to reach the dye supported on the surface of the transparent semiconductor layer so as to excite the dye. The excited dye promptly delivers electrons to the transparent semiconductor layer. On the other hand, the dye that is charged positive because of the loss of the electrons receives electrons from ions in the carrier movement layer, thereby the dye is electrically neutralized. The ions that have delivered the electrons are diffused into the transparent electrode, thereby the ion received the electrons. The oxide electrode and the transparent electrode perform the functions of the negative electrode and the positive electrode, respectively, so as to allow the wet type dye-sensitized solar cell to perform its function.

A solvent having a low molecular weight is used in the wet type dye-sensitized solar cell. In order to prevent the leakage of the liquid, it is necessary to shield strictly the wet type dye-sensitized solar cell. However, it is difficult to maintain the shielded state for many years, with the result that it is worried about that the cell performance may be deteriorated and an adverse effect may be given to the environment by the loss of the solvent caused by evaporation of the solvent and by leakage of the solvent. Under the circumstances, it is proposed to use a solid electrolyte layer having an ionic conductivity or an electron conductivity, which does not contain a solvent, in place of the liquid carrier movement layer. A solar cell of this type is called an all solid dye-sensitized solar cell.

The problem of the liquid leakage need not be worried about in the solid dye-sensitized solar cell. However, a new problem is generated in the solid dye-sensitized solar cell. Specifically, the semiconductor electrode such as the oxide electrode and the solid electrolyte layer differ from each other in the thermal expansion coefficient, with the result that the solid electrolyte layer tends to be peeled off from the semiconductor electrode during the heat cycle. It follows that the energy conversion efficiency is deteriorated.

BRIEF SUMMARY OF THE INVENTION

An object of the present invention is to provide a raw material kit for an electrolytic composition capable of obtaining a high energy conversion efficiency in the dye-sensitized solar cell.

Another object of the present invention is to provide an electrolytic composition capable of obtaining a high energy conversion efficiency in the dye-sensitized solar cell.

Further, still another object of the present invention is to provide a dyed-sensitized solar cell capable of obtaining a high energy conversion efficiency.

According to a first aspect of the present invention, there is provided a dye-sensitized solar cell, comprising:

an n-type semiconductor electrode containing a dye;

a counter electrode; and a gel electrolyte arranged between the n-type semiconductor electrode and the counter electrode, the gel electrolyte containing a gelling agent and an electrolyte containing iodine;

wherein the gelling agent contains at least one kind of a polymer selected from the group consisting of a first polymer in which polysulfonic acid is crosslinked by a metal ion having a valency of not less than two, a second polymer in which polycarboxylic acid is crosslinked by a metal ion having a valency of not less than two, a third polymer in which a quatertiary ammonium salt of polysulfonic acid is crosslinked by a metal ion having a valency of not less than two and a fourth polymer in which a quatertiary ammonium salt of polycarboxylic acid is crosslinked by a metal ion having a valency of not less than two.

According to a second aspect of the present invention, there is provided a raw material kit for an electrolytic composition, comprising at least two raw materials to be mixed together for obtaining an electrolytic composition, wherein the at least two raw materials comprises:

a first raw material including at least one kind of an ammonium salt selected from the group consisting of a quatertiary ammonium salt of polysulfonic acid and a quatertiary ammonium salt of polycarboxylic acid; and a second raw material including a halide of metal having a valency of not less than two.

According to a third aspect of the present invention, there is provided an electrolytic composition, which is a mixture comprising:

an electrolyte containing iodine;

at least one ammonium salt selected from the group consisting of a quatertiary ammonium salt of polysulfonic acid and a quatertiary ammonium salt of polycarboxylic acid; and a halide of metal having a valency of not less than two.

According to a fourth aspect of the present invention, there is provided a dye-sensitized solar cell, comprising:

an n-type semiconductor electrode containing a dye;

a counter electrode; and a gel electrolyte arranged between the n-type semiconductor electrode and the counter electrode, the gel electrolyte containing a gelling agent and an electrolyte containing iodine;

wherein the gelling agent contains a polymer in which a compound comprising at least two nitrogen-containing heterocyclic groups is crosslinked by at least one kind of a metal ion selected from the group consisting of a boron ion, a scandium ion, a silicon ion, a phosphorus ion, an aluminium ion, transition metal ions and alkaline-earth metal ions excluding a calcium ion.

According to a fifth aspect of the present invention, there is provided a raw material kit for an electrolytic composition, comprising at least two raw materials to be mixed together for obtaining an electrolytic composition, wherein the at least two raw materials comprises:

a first raw material including a compound comprising at least two nitrogen-containing heterocyclic groups; and a second raw material including at least one metal halide selected from the group consisting of a boron halide, a scandium halide, a silicon halide, a phosphorus halide, an aluminium halide, transition metal halides and alkaline-earth metal halides excluding a calcium halide.

Further, according to a sixth aspect of the present invention, there is provided an electrolytic composition, which is a mixture comprising:

an electrolyte containing iodine;

a compound comprising at least two nitrogen-containing heterocyclic groups; and at least one metal halide selected from the group consisting of a boron halide, a scandium halide, a silicon halide, a phosphorus halide, an aluminium halide, transition metal halides and alkaline-earth metal halides excluding a calcium halide.

BRIEF DESCRIPTION OF THE SEVERAL VIEWS OF THE DRAWING

In FIGS. 1(a), (b), (c) and (d) are cross sectional views schematically showing the manufacturing process of a dye-sensitized solar cell for Example 1 of the present invention.

DETAILED DESCRIPTION OF THE INVENTION

An example of a raw material kit for a first electrolytic composition of the present invention and an example of a first electrolytic composition of the present invention will now be described first.

The raw material kit for the first electrolytic composition of the present invention comprises at least two kinds of raw materials that are converted into an electrolytic composition, if mixed. At least two kinds of raw materials noted above include a first raw material containing at least one ammonium salt selected from the group consisting of a quatertiary ammonium salt of polysulfonic acid and a quatertiary ammonium salt of polycarboxylic acid, and a second raw material including a halide of metal having a valency of not less than two. It is possible for at least two kinds of raw materials to further contain a third raw material including an electrolyte containing iodine. It is possible for the first, second and third raw materials to be mixed with each other. Also, it is possible for at least one of the first raw material and the second raw material to be in the state of a mixture. Where the mixture is contained in the raw material kit, it is possible to use a raw material kit comprising a mixture A as the first raw material in which the at least one ammonium salt is dissolved in the electrolyte and a mixture B as the second raw material in which the metal halide is dissolved in the electrolyte.

The electrolytic composition is a mixture including an electrolyte, at least one ammonium salt dissolved in the electrolyte and a metal halide dissolved in the electrolyte. The electrolyte contains iodine. The at least one ammonium salt is selected from the group consisting of a quatertiary ammonium salt of polysulfonic acid and a quatertiary ammonium salt of polycarboxylic acid. A valency of a metal component of the metal halide is not less than two.

The electrolytic composition can be obtained by mixing at least two kinds of raw materials of the raw material kit. Various methods including methods (a) and (b) given below can be used for mixing the at least two raw materials:

(a) Prepared is a raw material kit in which the first raw material noted above, the second raw material noted above and the third raw material noted above are not mixed with each other. An electrolytic composition is prepared by allowing the at least one ammonium salt of the first raw material and the metal halide of the second raw material to be dissolved in the electrolyte of the third raw material.

(b) An electrolyte A as the first raw material is prepared by dissolving the at least one ammonium salt in the electrolyte. Also, an electrolyte B as the second raw material is prepared by dissolving the metal halide in the electrolyte. The raw material kit including the electrolyte A and the electrolyte B thus prepared is stored. The stored electrolyte A and the stored electrolyte B are mixed, when required, and the resultant mixture of the electrolytes A and B is used as the electrolyte composition.

(Ammonium Salt)

It is possible to use as the ammonium salt a quatertiary ammonium salt of a polysulfonic acid, a quatertiary ammonium salt of a polycarboxylic acid, or a mixture of a quatertiary ammonium salt of polysulfonic acid and a quatertiary ammonium salt of polycarboxylic acid.

The quatertiary ammonium salt of polysulfonic acid can be obtained by, for example, allowing at least one kind of a compound selected from the group consisting of a primary to tertiary amine compound and ammonium hydroxide to react with polysulfonic acid. It is desirable for a single molecule of the quatertiary ammonium salt of polysulfonic acid to have at least two ammonium salt groups ($-SO_3NR_4$). It is more desirable to use a quatertiary ammonium salt of polysulfonic acid in which at least some of the side chain of a polysulfonic acid is substituted by the ammonium salt group ($-SO_3NR_4$).

On the other hand, the quatertiary ammonium salt of polycarboxylic acid can be obtained by, for example, allowing at least one kind of a compound selected from the group consisting of a primary to tertiary amine compound and ammonium hydroxide to react with polycarboxylic acid. It is desirable for a single molecule of the quatertiary ammonium salt of polycarboxylic acid to have at least two ammonium salt groups ($-COONR_4$). It is more desirable to use a quatertiary ammonium salt of polycarboxylic acid in which at least some of the side chain of a polycarboxylic acid is substituted by ammonium salt groups ($-COONR_4$). A polymer having $-SO_3NR_4$ or $-COONR_4$ in at least some of the side chains permits improving the solubility of the polymer in an electrolyte and also permits gelling the electrolyte composition with a small amount of the polymer.

Each of the four atomic groups $R_4$ included in $-SO_3NR_4$ and $-COONR_4$ represents a hydrogen atom or at least one atomic group selected from the group consisting of a substituted or unsubstituted alkyl group, a substituted or fused aryl group, and a substituted or fused heterocyclic group. These four atomic groups $R_4$ may be the same or different.

The substituted or unsubstituted alkyl group may be linear or branched. Also, it is desirable for each of the substituted alkyl group and the unsubstituted alkyl group to have 1 to 22 carbon atoms. The substituent that can be bonded to an alkyl group includes, for example, a halogen atom, a cyano group, an alkoxy group, an alkoxy carbonyl group, an aryl group and a heterocyclic group. The preferred examples of the substituted or unsubstituted alkyl group includes, for example, methyl, isopropyl, butyl, t-butyl, heptyl, 2-methylhexyl, trifluoromethyl, benzyl and 3-methoxypropyl.

It is desirable for each of the substituted aryl group and the fused aryl group to have 6 to 22 carbon atoms. The substituent that can be bonded to an aryl group includes, for example, a halogen atom, a cyano group and an alkyl group. The desirable examples of the substituted or fused aryl group includes, for example, phenyl, 4-methylphenyl, 3-cyanophenyl, 4-bromophenyl and 1-naphthyl.

Further, it is desirable for each of the substituted heterocyclic group and the fused heterocyclic group to comprise a nitrogen-containing heterocyclic ring having 3 to 22 carbon atoms. The substituent that can be bonded to a heterocyclic group includes, for example, a halogen atom, a cyano group and an alkyl group. The desirable examples of the substituted or fused heterocyclic group includes, for example, 4-pyridyl, 3-pyridyl, 2-pyridyl, 2-pyrimidyl, 2-imidazolyl, and 2-thiazolyl.

Each of the quaternary ammonium salt of polysulfonic acid and the quaternary ammonium salt of polycarboxylic acid is capable of reacting with a halide of metal having a valency of not less than two so as to form a metal salt and a by-product of an ammonium salt represented by formula (I) given below.

$$R_4NX \qquad (1)$$

where R is similar to R included in —$SO_3NR_4$ and —$COONR_4$ described previously, and X is a halogen atom.

The ammonium salt in which X represents an iodine atom is particularly desirable for use as a component of the electrolyte because the particular ammonium salt makes it possible to improve the energy conversion efficiency of the solar cell.

According to the quaternary ammonium salt of polysulfonic acid in which at least one R of the —$SO_3NR_4$ group represents a hydrogen atom or the quaternary ammonium salt of polycarboxylic acid in which at least one R of the —$COONR_4$ group represents a hydrogen atom, a hydrogen atom bonded directly to the nitrogen atom, i.e., N—H, is contained in the by-product ammonium salt. As a result, it is possible for a high energy conversion efficiency not to be obtained in the dye-sensitized solar cell. Where all R's of the ammonium salt groups noted above represent hydrocarbon radicals, a hydrogen atom bonded directly to the nitrogen atom is not contained in the by-product ammonium salt so as to make it possible to obtain a high energy conversion efficiency in the dye-sensitized solar cell. It is most desirable to use the quaternary ammonium salt of polycarboxylic acid in each of R of the —$COONR_4$ group independently represents an alkyl group, a substituted alkyl group, a substituted aryl group, a fused aryl group, a substituted heterocyclic group, or a fused heterocyclic group.

The quaternary ammonium salt of polysulfonic acid used in the present invention includes, for example, tetraethyl ammonium salt of polyvinyl benzene sulfonic acid and triethylphenyl ammonium salt of polyvinyl benzene sulfonic acid. On the other hand, the quaternary ammonium salt of polycarboxylic acid used in the present invention includes, for example, tetramethyl ammonium salt of polymethacrylic acid, tetramethyl ammonium salt of polyacrylic acid, trimethylphenyl ammonium salt of polyacrylic acid, trimethylbenzyl ammonium salt of polyacrylic acid, tetraethyl ammonium salt of polymethacrylic acid, tetrapropyl ammonium salt of polymethacrylic acid, tetrabutyl ammonium salt of polymethacrylic acid, tetrahexyl ammonium salt of polymethacrylic acid, and tetraethyl ammonium salt polyvinyl benzoic acid.

It is desirable for the weight average molecular weight of the quaternary ammonium salt of polysulfonic acid and for the weight average molecular weight of the quaternary ammonium salt of polycarboxylic acid to fall within a range of from 500 to 10,000,000. If the weight average molecular weight of the quaternary ammonium salt is lower than 500, it is possible for the gelling of the electrolyte composition to be rendered difficult. On the other hand, if the weight average molecular weight of the quaternary ammonium salt exceeds 10,000,000, the viscosity of the electrolyte composition is markedly increased so as to make it difficult to permeate the electrolyte composition into a cell. It is more desirable for the weight average molecular weight of the quaternary ammonium salt to fall within a range of from 1,000 to 1,000,000.

A quaternary ammonium salt of polysulfonic acid has a functional group represented by —$SO_3NR_4$. It is possible for the quaternary ammonium salt of polysulfonic acid to have a sulfonic group (—$SO_3H$) in addition to the functional group represented by —$SO_3NR_4$. It is desirable for the number of substituents —$SO_3NR_4$ to fall within a range of from 5% to 100% on the basis that the sum of the functional groups —$SO_3H$ and —$SO_3NR_4$ is set at 100%. The concentration of the quaternary ammonium salt represented by formula (1) given previously in the electrolyte can be increased by setting the number of substituents —$SO_3NR_4$ at 20% or more so as to make it possible to further improve the energy conversion efficiency of the solar cell. It is more desirable for the number of substituents —$SO_3NR_4$ to fall within a range of from 30% to 100%.

A quaternary ammonium salt of polycarboxylic acid has a functional group represented by —$COONR_4$. It is possible for the quaternary ammonium salt of polycarboxylic acid to have a carboxyl group (—COOH) in addition to the functional group represented by —$COONR_4$. It is desirable for the number of substituents —$COONR_4$ to fall within a range of from 5% to 100% on the basis that the sum of the functional groups —COOH and —$COONR_4$ is set at 100%. The concentration of the quaternary ammonium salt represented by formula (1) given previously in the electrolyte can be increased by setting the number of substituents —$COONR_4$ at 20% or more so as to make it possible to further improve the energy conversion efficiency of the solar cell. It is more desirable for the number of substituents —$COONR_4$ to fall within a range of from 30% to 100%.

(Metal Halide)

Where the metal element of the metal halide has a valency of not less than two, it is possible for the metal ion to form a crosslinked structure in the ammonium salts, thereby obtaining a metal salt having a crosslinked structure. As a result, the electrolyte composition is gelled by the metal salt having the crosslinked structure. Particularly, it is desirable for the valency of the metal element to fall within a range of from the divalent state to the tetravalent state. It should be noted that, if the number of valences of the metal element exceeds four (tetravalent), the salt formed by the reaction between the carboxyl group and the metal halide is rendered unstable.

The halide of metal that has a valency of not less than two includes, for example, a halide of Mg, a halide of Ca, a halide of Zn, a halide of Al, a halide of B, a halide of Sc, a halide of Ga, a halide of Si, a halide of Ti, a halide of Ge, and a halide of P. It is possible to use a single kind or a plurality of different kinds of metal halides. Particularly, it is desirable to use a halide of Mg or a halide of Zn. The specific metal halides in which a valency of the metal element is not less than two include, for example, $ZnI_2$, $MgI_2$, $CaCl_2$, $ZnCl_2$, $AlI_3$, $BCl_3$, $ScBr_3$, $PCl_3$, $GaI_3$, $SiI_4$, $TiBr_4$, and $GeI_4$. Among these metal halides, it is desirable to use a metal iodide, particularly, $ZnI_2$.

An example of a second raw material kit for the electrolyte composition of the present invention and an example of the second electrolytic composition of the present invention will now be described.

The second raw material kit for the electrolytic composition of the present invention comprises at least two kinds of raw materials that are converted into an electrolytic composition, if mixed. At least two kinds of the raw materials noted above include a first raw material containing a compound comprising at least two nitrogen-containing heterocyclic groups, and a second raw material including at least one metal halide selected from the group consisting of a boron halide, a scandium halide, a silicon halide, a phosphorus halide, an aluminium halide, transition metal halides and alkaline-earth metal halides excluding a calcium halide. It is possible for at least two kinds of raw materials to further contain a third raw material including an electrolyte containing iodine. It is possible for the first, second and third raw materials to be mixed with each other. Also, it is possible for either the first raw material or the second raw material to be in the state of a mixture. Where a mixture is contained in the raw material kit, it is possible to use a raw material kit comprising a mixture A as the first raw material in which a compound comprising at least two nitrogen-containing heterocyclic groups is dissolved in the electrolyte and a mixture B as the second raw material in which at least one kind of a metal halide is dissolved in the electrolyte.

The electrolytic composition is a mixture comprising an electrolyte containing iodine, a compound dissolved in the electrolyte and comprising at least two nitrogen-containing heterocyclic groups, and at least one metal halide dissolved in the electrolyte and selected from the group consisting of a boron halide, a scandium halide, a silicon halide, a phosphorus halide, an aluminium halide, transition metal halides and alkaline-earth metal halides excluding a calcium halide.

The electrolytic composition can be obtained by mixing at least two kinds of said raw materials of the raw material kit noted above. Various methods including, for example, methods (a) and (b) given below can be employed for mixing at least two kinds of the raw materials of the raw material kit:

(a) Prepared is a raw material kit in which the first raw material noted above, the second raw material noted above and the third raw material noted above are not mixed with other. The electrolytic composition is prepared by allowing the compound having at least two nitrogen-containing heterocyclic groups of the first raw material and at least one metal halide of the second raw material to be dissolved in the electrolyte of the third raw material.

(b) An electrolyte A as the first raw material is prepared by dissolving the compound comprising at least two nitrogen-containing heterocyclic groups in the electrolyte. Also, an electrolyte B as the second raw material is prepared by dissolving the at least one metal halide in the electrolyte. The raw material kit that includes the electrolyte A thus obtained and the electrolyte B thus obtained is stored. The stored electrolyte A and the stored electrolyte B are mixed when required, and the resultant mixed electrolyte is used as the electrolytic composition.

(Compound Comprising at Least Two Nitrogen-Containing Heterocyclic Groups)

The skeleton of the backbone chain of the compound comprising at least two nitrogen-containing heterocyclic groups is not particularly limited. It is possible for the skeleton to be formed of any divalent organic group comprising at least one kind of an atom selected from the group consisting of a carbon atom, an oxygen atom, a sulfur atom and a nitrogen atom. The divalent organic group noted above includes, for example, an alkylene group, an arylene group, a carbonyl group, an ether group, an ester group, and an organic group formed of a combination of these organic groups.

The alkylene group noted above includes, for example, a linear alkylene group comprising 1 to 10 carbon atoms and a branched alkylene group comprising 1 to 10 carbon atoms. To be more specific, the alkylene group used in the present invention includes, for example, $-(CH_2)_n-$ (n being an integer of 1 to 10), $-CH_2CH(CH_3)-$, $-CH(CH_3)CH(CH_3)-$, and $-CH_2CH(CH_3)CH_2-$.

The arylene group used in the present invention includes, for example, phenylene, naphthylene, anthracenylene, biphenylene, triphenylene, stilbenylene, and naphenylene. Also, the substituent of the aromatic ring includes, for example, an alkyl group (e.g., methyl, ethyl, propyl, isopropyl, butyl, isobutyl, t-butyl), an alkoxy group (e.g., methoxy, ethoxy, propoxy, isopropoxy, butoxy, isobutoxy, t-butoxy), an halogen atom (F, Cl, Br, I), nitro group, a cyano group, and a hydroxy group. Further, it is possible to use a polymer such as polyethylene, polyester, polycarbonate, polymethyl methacrylate, polyacrylonitrile, polyamide and polyethylene terephthalate as the substituent of the aromatic ring.

The nitrogen-containing heterocyclic substituent used in the present invention includes, for example, pyrrolyl group, imidazolyl group, pyrazolyl group, isothiazolyl group, isoxazolyl group, pyridyl group, pyrazinyl group, pyrimidinyl group, pyridazinyl group, indolizinyl group, isoindolyl group, indolyl group, isoazolyl group, purinyl group, quinolizinyl group, isoquinolyl group, quinolyl group, phthalazinyl group, naphthyridinyl group, quinoxalinyl group, quinazolinyl group, cinnolinyl group, pheridinyl group, carbazolyl group, carbolinyl group, phenanthridinyl group, acridinyl group, perimidinyl group, phenanthrolinyl group, phenazinyl group, phenothiazinyl group, furazanyl group, phenoxazinyl group, pyrrolidinyl group, pyrrolinyl group, imidazolidinyl group, imidazolinyl group, pyrazolidinyl group, pyrazolinyl group, piperidyl group, piperazinyl group, indolinyl group, isoindolinyl group, quinuclidinyl group, morpholinyl group, 1-methyl imidazolyl group, 1-ethyl imidazolyl group, and 1-propyl imidazolyl group. It is also possible to use a spiro ring structure comprising at least one nitrogen-containing heterocyclic substituent selected from among the substituents exemplified above, or a hetero ring aggregate comprising a plurality of nitrogen-containing heterocyclic substituents selected from among the substituents exemplified above, as the substituent.

The compounds comprising a plurality of nitrogen-containing heterocyclic groups include, for example, polyvinyl imidazole, poly(4-vinyl pyridine), poly(2-vinyl pyridine), polybenzimidazole, bipyridyl, terpyridyl, polyvinyl pyrrole, 1,4-di(4-pyridyl) butane, 2-(4-pyridyl) ethyl ether, poly(4-vinyl-2,2'-bipyridyl) and compounds (a) to (e) given below:

compound (a)

compound (b)

compound (c)

compound (d)

compound (e)

It is desirable for the compound comprising a plurality of nitrogen-containing heterocyclic groups to have a weight average molecular weight falling within a range of from 500 to 10,000,000. If the weight average molecular weight is lower than 500, it is possible for the gelling of the electrolytic composition to be rendered difficult. On the other hand, if the weight average molecular weight exceeds 10,000,000, the viscosity of the electrolytic composition is markedly increased so as to make it difficult to impregnate the electrolytic composition into a cell. It is more desirable for the compound comprising a plurality of nitrogen-containing heterocyclic groups to have a weight average molecular weight falling within a range of from 1,000 to 1,000,000.

(Metal Halide)

The metal halide used in the present invention is at least one kind of a compound selected from the group consisting of a boron halide, a scandium halide, a silicon halide, a phosphorus halide, an aluminium halide, transition metal halides and alkaline-earth metal halides excluding a calcium halide. The metal halide performs the function of a crosslinking agent in the present invention.

It is desirable for the metal of the metal halide to have a valency of not less than two. In this case, the metal ion forms a crosslinked structure in the compounds comprising a plurality of nitrogen-containing heterocyclic groups, thereby obtaining a metal salt having a crosslinked structure. As a result, the electrolytic composition is gelled by the metal salt having the crosslinked structure. It is more desirable for the valency of the metal of the metal halide to fall within a range of from 2 to 4. It should be noted that, if the valency is increased, the gel tends to be rendered unstable.

If reaction is carried out between the compound comprising a plurality of nitrogen-containing heterocyclic groups and the metal halide, the compound noted above is crosslinked by the ion of the metal of the metal halide and, at the same time, the halogen remains in the gel electrolyte. If a metal chloride or a metal bromide is used as the metal halide, Cl or Br remains in the gel electrolyte. As a result, the voltage of the solar cell tends to be lowered. On the other hand, in the case of using a metal iodide as the metal halide, it is possible to ensure the voltage characteristics of the solar cell.

The ions of the transition metal of the metal halide include, for example, $Pb^{2+}$, $Zr^{4+}$, $Mo^{3+}$, $Cr^{2+}$, $Sn^{2+}$, $Sn^{4+}$, $Ge^{4+}$, $Ga^{3+}$, $Ni^{2+}$, $Ti^{4+}$, $Co^{2+}$, $Zn^{2+}$, $Cu^{2+}$, $Ru^{3+}$, $Pt^{4+}$, $Mn^{2+}$, $Os^{3+}$, $Ir^{2+}$, $Ir^{3+}$, $Ir^{4+}$, $Rh^{3+}$, $Pd^{2+}$ and $Fe^{2+}$. Examples of the transition metal halide include $PbI_2$, $SnI_2$, $SnI_4$, $GeI_4$, $GaI_3$, $TiI_4$, $NiI_2$, $CoI_2$, $ZnI_2$, $MgI_2$, $MgCl_2$, $CuI_2$, $ZnI_2$, $RuI_3$, $PtI_4$, $MnI_2$, $OsCl_3$, $IrBr_3$, $RhI_3$, $PdI_2$, and $FeI_2$. Particularly, it is desirable to use metal iodides in the present invention.

It is possible for ligands other than halogen atoms to be present in the metal halide. For example, it is possible for an organic acid group such as acetic acid group or a oxalic acid group and an inorganic acid radical such as a carbonic acid radical or a nitric acid radical to be present in the metal halide.

Among the metal halides, it is desirable to use ruthenium halide, rhodium halide, osmium halide, magnesium halide, a halide of platinum, a halide of zinc, a halide of copper or a halide of iron because ruthenium halide etc. make it possible to moderate appropriately the gelling rate of the electrolytic composition. As a result, it is possible to avoid the inconvenience that the electrolytic composition begins to be gelled while the electrolytic composition is being permeated into the solar cell so as to permit the electrolytic composition to permeate the solar cell uniformly. It follows that it is possible to further improve the energy conversion efficiency of the solar cell. Among the metal halides, ruthenium halide, rhodium halide or osmium halide produces the most prominent effect of allowing the electrolytic composition to permeate uniformly a solar cell.

The raw material kits for the first and second electrolytic compositions of the present invention and the electrolytes contained in the first and second electrolytic compositions of the present invention will now be described.

(Electrolyte)

The electrolyte contains iodine molecules ($I_2$).

It is desirable for the electrolyte to further contains a reversible redox couple consisting of $I^-$ and $I^{3-}$. The reversible redox couple can be supplied from, for example, a mixture of iodine molecules ($I_2$) and an iodide.

It is desirable for the redox couple to exhibit a redox potential lower by 0.1 to 0.6V than an oxidation potential of a dye described herein later. In the redox couple exhibiting a redox potential lower by 0.1 to 0.6V than an oxidation potential of the dye, a reducing species such as $I^-$ is capable of receiving holes from the oxidized dye. In the electrolyte containing this redox couple, the charge transfer between the n-type semiconductor electrode and the conductive film is promoted, and the open-circuit voltage can be increased.

It is desirable for the electrolyte to contain both iodine molecules ($I_2$) and an iodide. The iodide contained in the electrolyte includes, for example, an iodide of an alkali metal, an iodide of an organic compound and a molten salt of an iodide.

The molten salt of the iodide used in the present invention includes iodides of a nitrogen-containing heterocyclic compound such as imidazolium salt, pyridinium salt, quaternary ammonium salt, pyrrolidinium salt, pyrazolidinium salt, isothiazolidinium salt and isoxazolidinium salt.

The specific compounds of the molten salt of the iodide include, for example, 1-methyl-3-propyl imidazolium iodide, 1,3-dimethyl imidazolium iodide, 1-methyl-3-ethyl imidazolium iodide, 1-methyl-3-pentyl imidazolium iodide, 1-methyl-3-isopentyl imidazolium iodide, 1-methyl-3-hexyl imidazolium iodide, 1,2-dimethyl-3-propyl imidazolium iodide, 1-ethyl-3-isopropyl imidazolium iodide, 1-propyl-3-propyl imidazolium iodide, pyrrolidinium iodide, ethyl pyridinium iodide, butyl pyridinium iodide, hexyl pyridinium iodide, and trihexyl methyl ammonium iodide. It is possible to use as the molten salt of the iodide a single compound or a plurality of compounds selected from the compounds exemplified above.

(Organic Solvent)

Each of the raw material kits for the first and second electrolytic compositions of the present invention and the first and second electrolytic compositions of the present invention further comprises an organic solvent. The electrolytic composition containing an organic solvent has a low viscosity and, thus, is capable of permeating easily the n-type semiconductor electrode. Also, the electrolytic composition containing an organic solvent permits increasing the ionic conductance of the gel electrolyte.

Particularly, it is desirable to use at least one solvent selected from the group consisting of a solvent capable of exhibiting an excellent ionic conductivity because low viscosity, a solvent having a high effective carrier concentration because high dielectric constant, and a solvent exhibiting a high ionic mobility because both of low viscosity and high dielectric constant. To be more specific, it is desirable to use a nonprotic organic solvent including, for example, carbonic acid esters such as ethylene carbonate and propylene carbonate; lactones such as γ-butyrolactone, γ-valerolactone and δ-valerolactone; ethers such as 1,2-dimethoxy ethane, diethoxy ethane, ethylene glycol dimethyl ether, polyethylene glycol dimethyl ether and 1,4-dioxane; alcohols such as ethanol, ethylene glycol monomethyl ether, polyethylene glycol monoalkyl ether; glycol such as ethylene glycol, propylene glycol, and polyethylene glycol; tetrahydrofurans such as tetrahydrofuran and 2-methyl tetrahydrofuran; nitriles such as acetonitrile, glutarodinitrile, propionitrile, methoxy acetonitrile and benzonitrile; esters of carboxylic acids such as methyl acetate, ethyl acetate, and ethyl propionate; triesters of phosphoric acid such as trimethyl phosphate and triethyl phosphate; heterocyclic compounds such as N-methyl pyrrolidone, 2-methyl-1,3-dioxoran and sulfolane; dimethyl sulfoxide; formamide; N,N-dimethyl formamide; and nitro methane. It is possible to use these solvents in the form of a mixture of a plurality of the compounds exemplified above.

It is desirable for the amount of the organic solvent to be not larger than 65% by weight based on 100% by weight of each of the raw material kit for the electrolytic composition and the electrolytic composition. If the amount of the organic solvent exceeds 65% by weight, the gel electrolyte tends to be denatured markedly, and the gelling tends to be impaired. It is more desirable for the amount of the organic solvent to fall within a range of from 1% by weight to 20% by weight.

(Water)

It is desirable for each of the first and second electrolytic compositions of the present invention to contain water. The electrolytic composition containing water permits further improving the energy conversion efficiency of the dye-sensitized solar cell.

It is desirable for the water content of the electrolytic composition to be not higher than 10% by weight, with the sum of the molten salt of the iodide and water set at 100% by weight. It is more desirable for the water content to fall within a range of from 0.01% to 10% by weight, most desirably between 0.5% to 5% by weight, with the sum of the molten salt of the iodide and water set at 100% by weight.

An example of each of the first and second dye-sensitized solar cells of the present invention will now be described.

Each of the first and second dye-sensitized solar cells of the present invention comprises a substrate having a light receiving surface, a transparent electrode film formed on the surface of the substrate, an n-type semiconductor electrode formed on the transparent conductive film and having a dye adsorbed on the surface, a counter electrode comprising a counter substrate positioned to face the n-type semiconductor electrode and a conductive film formed on that surface of the counter substrate which faces the n-type semiconductor substrate, and a gel electrolyte interposed between the conductive film of the counter electrode and the n-type semiconductor electrode.

The gel electrolyte, the transparent conductive film, the n-type semiconductor electrode, the dye, the counter substrate and the conductive film noted above will now be described.

1) Gel Electrolyte

The gel electrolyte used in the first solar cell of the present invention contains a gelling agent and an electrolyte containing iodine. The gelling agent contains at least one kind of a polymer selected from the group consisting of a first polymer in which polysulfonic acid is crosslinked by a metal ion having a valency of not less than two, a second polymer in which polycarboxylic acid is crosslinked by a metal ion having a valency of not less than two, a third polymer in which a quatertiary ammonium salt of polysulfonic acid is crosslinked by a metal ion having a valency of not less than two and a fourth polymer in which a quatertiary ammonium salt of polycarboxylic acid is crosslinked by a metal ion having a valency of not less than two.

The metal ions having a valency of not less than two include, for example, $Mg^{2+}$, $Ca^{2+}$, $Zn^{2+}$, $Al^{3+}$, $B^{3+}$, $Sc^{3+}$, $Ga^{3+}$, $Si^{4+}$, $Ti^{4+}$, $Ge^{4+}$, and $P^{3+}$. It is possible to use at least one kind of the metal ion selected from the group exemplified above as the metal ion having a valency of not less than two.

It is possible to use as the first polymer a metal salt obtained by, for example, allowing a metal halide to react with the quatertiary ammonium salt of polysulfonic acid. On the other hand, it is possible to use as the second polymer a metal salt obtained by, for example, allowing a metal halide to react with the quatertiary ammonium salt of polycarboxylic acid. Incidentally, it is possible for the gel electrolyte to contain an unreacted quatertiary ammonium salt of polysulfonic acid or an unreacted quatertiary ammonium salt of polycarboxylic acid. Also, it is possible to use as the gelling agent as the third polymer a crosslinked polymer formed by a partial reaction of a metal halide with a quatertiary ammonium salt of polysulfonic acid, the —$SO_3NR_4$ group remaining in the crosslinked polymer. It is possible to use as the gelling agent as the fourth polymer a crosslinked polymer formed by a partial reaction of a metal halide with a quatertiary ammonium salt of polycarboxylic acid, the —$COONR_4$ group remaining in the crosslinked polymer.

An example of the reaction to form a metal salt is shown in chemical formula A given below:

Chemical Formula A:

by-product forms a part of molten salt

Chemical formula A represents the reaction formula between tetrabutyl ammonium salt of polymethacrylic acid and $MgI_2$. By the reaction shown in chemical formula A, the polymer molecules are crosslinked by a metal ion so as to form a metal salt. At the same time, the paired ions form a quatertiary ammonium salt of halogen as a by-product. The by-product is capable of performing the function of an electrolyte component.

The gel electrolyte can be prepared by, for example, gelling an electrolytic composition obtained by mixing the raw materials of the raw material kit for an electrolytic composition. Also, the crosslinked structure formed by the metal ion having a valency of not less than two in each of the first polymer, the second polymer, the third polymer and the fourth polymer can be confirmed by the infrared absorption spectrum.

The gel electrolyte contained in the second solar cell of the present invention will now be described.

The gel electrolyte contains a gelling agent and an electrolyte containing iodine. The gelling agent contains a crosslinked polymer formed by crosslinking of molecules of a compound comprising at least two nitrogen-containing heterocyclic groups, with at least one metal ion selected from the group consisting of a boron ion, a scandium ion, a silicon ion, a phosphorus ion, an aluminium ion, transition metal ions and alkaline-earth metal ions excluding a calcium ion. The polymer is a metal salt formed by, for example, the reaction between a compound comprising at least two nitrogen-containing heterocyclic groups and at least one kind of a metal halide selected from the group consisting of a boron halide, a scandium halide, a silicon halide, a phosphorus halide, an aluminium halide, transition metal halides and alkaline-earth metal halides excluding a calcium halide.

Chemical formula B given below exemplifies the reaction to form the metal salt:

Chemical Formula B:

Chemical formula B given above represents the formula of the reaction carried out between polyvinyl pyridine and $MgI_2$. In this reaction, the polymer molecules are crosslinked by the magnesium ion so as to form a polymer of a metal salt. Incidentally, iodine is coordinated with the magnesium ion.

The gel electrolyte can be prepared by, for example, gelling the electrolytic composition obtained by mixing the raw materials of the raw material kit for the electrolytic composition. Also, the crosslinked structure formed by the metal ion in the polymer can be confirmed by a infrared absorption spectrum.

2) Transparent Conductive Film

It is desirable for the transparent conductive film to be small in the absorption of the visible light region and to have a conductivity. Also, it is desirable for the transparent conductive film to be formed of a tin oxide film doped with fluorine or indium, or a zinc oxide film doped with fluorine or indium. Further, in order to prevent the increase in resistivity by improving the conductivity, it is desirable to use a metal matrix having a low resistivity such as a wire in combination with the transparent conductive film.

3) N-type Semiconductor Electrode

It is desirable for the n-type semiconductor electrode to be formed of a transparent semiconductor that is low in visible range absorption. A metal oxide semiconductor is desirable as such a semiconductor. To be more specific, it is desirable for the n-type semiconductor electrode to contain, for example, oxides of transition metals such as titanium, zirconium, hafnium, strontium, zinc, indium, yttrium, lanthanum, vanadium, niobium, tantalum, chromium, molybdenum and tungsten; perovskite semiconductors such as $SrTiO_3$, $CaTiO_3$, $BaTiO_3$, $MgTiO_3$, and $SrNb_2O_6$; composite oxides or mixtures of these oxides; and GaN.

The dyes absorbed on the surface of the n-type semiconductor electrode include, for example, a transition metal complex of ruthenium-tris type, a transition metal complex of ruthenium-bis type, a transition metal complex of osmium-tris type, a transition metal complex of osmium-bis type, ruthenium-cis-diaqua-bipyridyl complexes, phthalocyanine and porphyrin.

4) Counter Substrate:

It is desirable for the counter substrate to be low in visible range absorption and to have conductivity. It is also desirable for the counter substrate to be formed of a tin oxide film or a zinc oxide film.

5) Conductive Film:

The conductive film can be formed of a metal such as platinum, gold or silver.

Each of the first and second solar cells of the present invention can be prepared by, for example, the method described in the following.

In the first step, prepared is a cell unit comprising a substrate having a light receiving surface, a transparent conductive film formed on the surface of the substrate, an n-type semiconductor electrode formed on the transparent conductive film and having a dye adsorbed on the surface, and a counter electrode including a counter substrate positioned to face the n-type semiconductor electrode and a conductive film formed on that surface of the counter substrate which faces the n-type semiconductor electrode.

In the next step, an electrolytic composition is poured into the clearance between the substrate and the counter substrate, followed by gastight sealing the cell unit and subsequently gelling the electrolytic composition so as to obtain a dye-sensitized solar cell of the present invention.

In gelling the electrolytic composition, it is desirable to heat the cell unit. It is desirable for the temperature in the heat treatment to fall within a range of from 50° C. to 200° C. If the temperature for the heat treatment is lower than 50° C., it is difficult to obtain the effect of promoting the gelling of the electrolytic composition. On the other hand, if the temperature for the heat treatment is higher than 200° C., the dye tends to be decomposed. It is more desirable for the temperature for the heat treatment to fall within a range of from 70° C. to 150° C.

The first raw material kit for the electrolytic composition of the present invention comprises at least two kinds of raw materials for obtaining an electrolytic composition. At least two kinds of the raw materials are not mixed with each other or these raw materials are partly in the state of a mixture. Each of the plural raw materials comprises an electrolyte containing iodine; at least one kind of an ammonium salt selected from the group consisting of a quaterciary ammonium salt of polysulfonic acid and a quatertiary ammonium salt of polycarboxylic acid; and a halide of metal having a valency of not less than two. According to the particular raw material kit, the electrolytic composition can be gelled in the presence of an electrolyte containing iodine.

In other words, a method of polymerizing a monomer by the radical or ionic chain reaction in the presence of a small amount of a catalyst is known as a method of synthesizing a polymer used as a gelling agent. However, in the presence of an electrolyte containing iodine, the radical generating agent and the anionic polymerization initiating agent fail to perform their functions, with the result that a chain reaction-like polymerization does not take place. Such a monomer includes, for example, an acrylic resin and an epoxy resin. Also, a method represented by an ester exchange reaction, in which the polymerization is carried out while removing the by-products having a low molecular weight such as water and alcohol, is known as another synthetic method. Polyester, polyamide, etc. are synthesized by this method. However, the by-products formed during the polymerization reaction give adverse effects to the electrolyte and the dye molecules.

It should be noted that, in the present invention, the ammonium salt and the metal halide carry out an ionic reaction so as to form a metal salt acting as a gelling agent. As a result, the electrolytic composition can be gelled in the presence of iodine and without adding a catalyst. It should also be noted that, during the reaction to form the metal salt, the paired ions permit forming an ammonium salt of halogen as a by-product. What should be noted is that the ammonium salt thus formed performs the function of an electrolyte component. It follows that the ionic conductance of the gel electrolyte can be improved so as to provide a dye-sensitized solar cell exhibiting an improved energy conversion efficiency.

What should also be noted is that the gelling agent containing the metal salt is stable even if the solar cell is used over a long period of time and even if the temperature of the solar cell is elevated to about 50° C. to 70° C. by the irradiation with the sunlight so as to make it possible to avoid generation of the phase transition in the gel electrolyte. As a result, it is possible to prevent the liquid leakage when the temperature is elevated and to maintain a high energy conversion efficiency when the temperature is elevated.

In the present invention, at least one kind of a halide selected from the group consisting of a halide of Mg, a halide of Ca, a halide of Zn, a halide of Al, a halide of B, a halide of Sc, a halide of Ga, a halide of Si, a halide of Ti, a halide of Ge, and a halide of P is used as the metal halide in which a valency of the metal element is not less than two so as to further improve the energy conversion efficiency of the dye-sensitized solar cell.

Also, in the present invention, an iodide of a metal having a valency of not less than two is used as the halide of metal having a valency of not less than two. As a result, the ammonium salt obtained as a by-product in the metal salt forming reaction is a salt of iodine so as to further improve the ionic conductance of the gel electrolyte and, thus, to further improve the energy conversion efficiency of the dye-sensitized solar cell.

In the present invention, the electrolyte contains iodine molecules ($I_2$) and an iodine salt of a nitrogen-containing heterocyclic compound so as to improve the solubility of the ammonium salt in the electrolyte. Also, since it is possible to suppress the initial viscosity of the electrolytic composition to a low level, it is possible to permit the electrolytic composition to permeate the electrode promptly.

The second raw material kit for the electrolytic composition of the present invention comprises at least two kinds of raw materials for obtaining an electrolytic composition. At least two kinds of the raw materials are not mixed with each other or these raw materials are partly in the state of a mixture. Also, each of the plural raw materials comprises an electrolyte containing iodine; a compound comprising at least two nitrogen-containing heterocyclic groups; and at least one kind of a metal halide selected from the group consisting of a halide of boron halide, a halide of scandium, a halide of silicon, a halide of phosphorus, a halide of aluminium, halides of transition metal and halides of alkaline-earth metal excluding a halide of calcium.

According to the particular raw material kit, the electrolytic composition can be gelled in the presence of an electrolyte containing iodine. What should be noted is that, since an addition reaction is carried out between the compound comprising at least two nitrogen-containing heterocyclic groups and at least one kind of the metal halide so as to form a metal salt acting as a gelling agent, the electrolytic composition can be gelled in the presence of iodine and without adding a catalyst. In addition, since a by-product is not generated during the reaction to form the metal salt, it is possible to provide a dye-sensitized solar cell exhibiting a high energy conversion efficiency.

What should also be noted is that the gelling agent containing the metal salt is stable even if the solar cell is used over a long period of time and even if the temperature of the solar cell is elevated to about 50° C. to 70° C. by the irradiation with the sunlight so as to make it possible to avoid generation of the phase transition in the gel electrolyte. As a result, it is possible to prevent the liquid leakage when the temperature is elevated and to maintain a high energy conversion efficiency when the temperature is elevated.

In the present invention, the metal element of the metal compound has a valency of not less than two so as to make it possible for the metal ion to form the crosslinked structure in the compounds comprising at least two nitrogen-containing heterocyclic groups. It follows that the electrolytic composition can be gelled by the metal salt having a crosslinked structure.

Further, in the present invention, at least one metal halide selected from the group consisting of $SrI_2$, $BaI_2$, $BI_3$, $ScI_3$, $AlI_3$, $PI_3$, $SiI_4$, $PbI_2$, $SnI_2$, $SnI_4$, $GeI_4$, $GaI_3$, $TiI_4$, $NiI_2$, $CoI_2$, $ZnI_2$, $MgI_2$, $MgCl_2$, $CuI_2$, $ZnI_2$, $RuI_3$, $PtI_4$, $MnI_2$, $OsCl_3$, $IrBr_3$, $RhI_3$, $PdI_2$, and $FeI_2$ is used to further improve the energy conversion efficiency of the dye-sensitized solar cell.

Some Examples of the present invention will now be described in detail with reference to the accompanying drawings.

EXAMPLE 1

A paste was produced by adding nitric acid to a high purity titanium oxide (anatase) powder having an average primary particle diameter of 30 nm, kneading those together with pure water, and stabilizing a resulting material by a surfactant. The paste was printed on a dense portion formed on a glass substrate by screen printing and then heat-treated at 450° C., whereby a 2-μm thick n-type semiconductor electrode layer containing a titanium oxide (anatase) was formed. By repeating the screen printing and the heat treatment plural times, an 8-μm thick n-type semiconductor electrode 4 containing anatase-phase titanium oxide 3 was formed finally on a fluoride-doped tin oxide conductive film 2 as a transparent conductive film. The n-type semiconductor electrode 4 had a roughness factor of 1,500. The roughness factor was determined from a nitrogen absorption amount for a projection area of the substrate.

The substrate was immersed for 4 hours in a dried ethanol solution (temperature: about 80° C.) of $3\times10^{-4}$ mol of [cis-bis(anato)-N,N-bis(2,2'-dipyridyl-4,4'-dicarboxylic)-ruthenium (II) hydrate] and then lifted in an argon flow, whereby a ruthenium complex as a dye was carried by the surface of the n-type semiconductor electrode 4.

A counter electrode 5 containing a glass substrate 7 on which platinum-added, fluorine-doped tin oxide electrode 6 was placed on the above substrate 1 formed with the n-type semiconductor electrode 4 by using spacers having a diameter of 15 μm, and the two substrates were fixed to each other by applying an epoxy resin 8 to a peripheral portion except an electrolyte liquid inlet.

Figure 1:
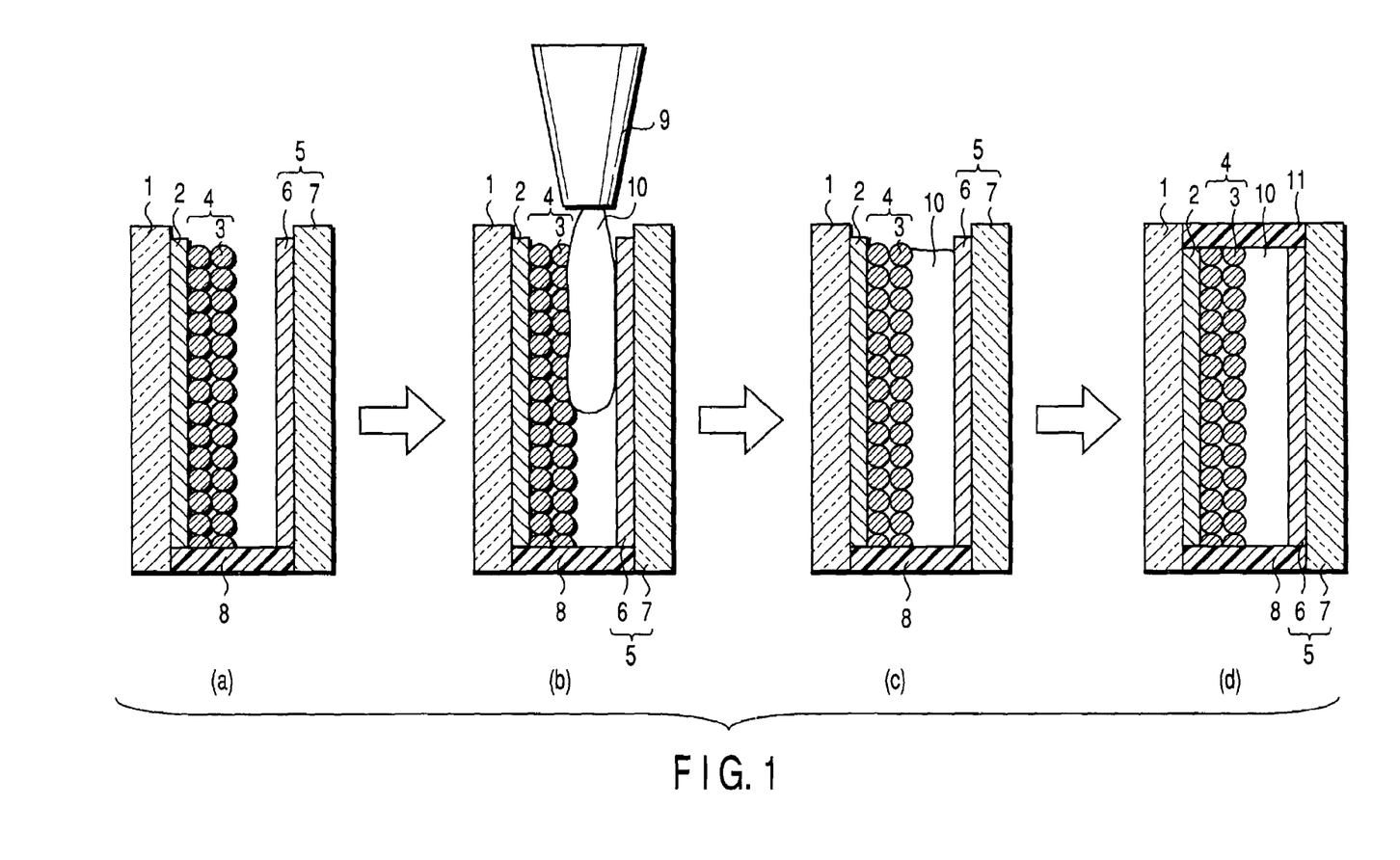

Portion (a) in FIG. 1 is a cross sectional view showing the photovoltaic unit thus obtained.

An electrolyte was prepared by dissolving 0.5M of tetrapropylammonium iodide, 0.02M of potassium iodide, and 0.09M of iodine in 1-methyl-3-propyl imidazolium iodide. Then, 0.2 g of tetrabutyl ammonium salt of polymethacrylic acid and 0.1 g of $MgI_2$ were added to 10 g of the electrolyte thus prepared so as to obtain an electrolyte composition.

Incidentally, used was tetrabutyl ammonium salt of polymethacrylic acid in which each of the carboxyl groups (—COOH) of the polymethacrylic acid was substituted by —COON($C_4H_9$)$_4$. In other words, the number of substituents —COON($C_4H_9$)$_4$ was 100%.

As shown in portion (b) and (c) in FIG. 1, the electrolyte composition 10 was poured into an open portion of the photovoltaic unit through a pouring port 9 so as to permit the electrolyte composition 10 to permeate into the n-type semiconductor electrode 4 and to be poured into the gap between the n-type semiconductor electrode 4 and a tin oxide electrode 6 (conductive film 6).

Figure 2:
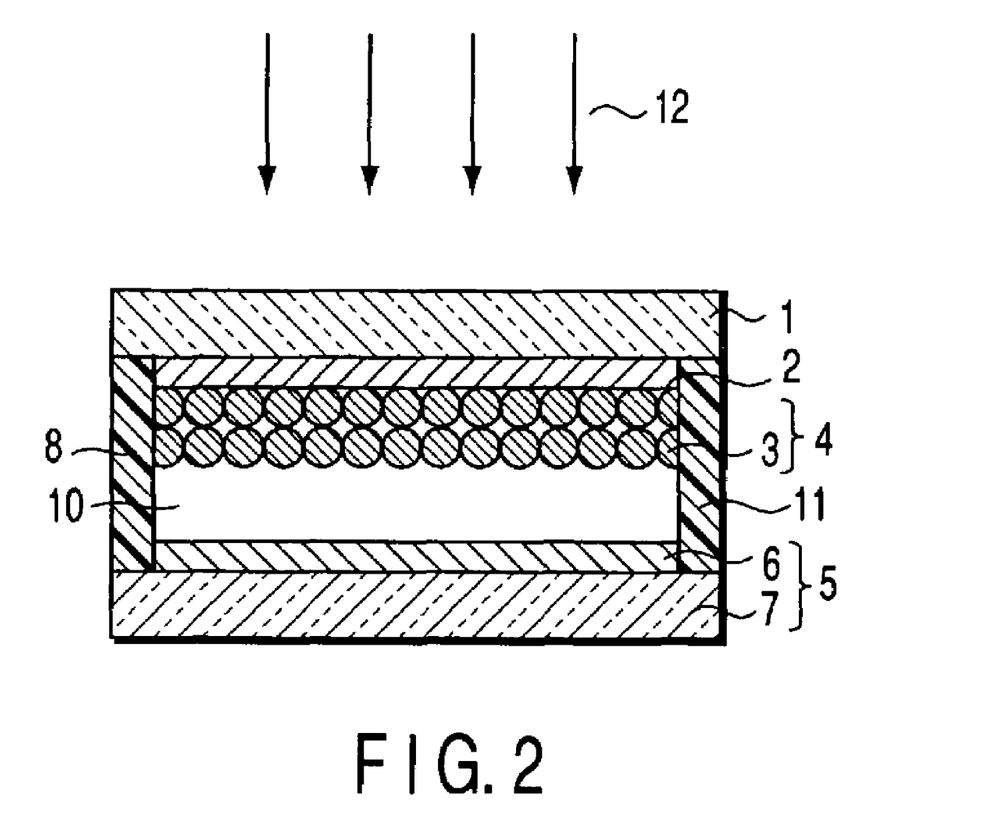
FIG. 2 is a cross sectional view showing the construction of the dye-sensitized solar cell for Example 1 of the present invention.

In the next step, the open portion of the photovoltaic unit was sealed with an epoxy resin 11 as shown in portion (d) in FIG. 1, followed by heating on a hot plate at 60° C. for 30 minutes so as to obtain a photovoltaic device, i.e., a dye sensitized solar cell. FIG. 2 is a cross sectional view showing the solar cell thus obtained.

As shown in FIG. 2, a transparent conductive film 2 is formed on a glass substrate 1, and a transparent n-type semiconductor electrode 4 is formed on the transparent conductive film 2. The semiconductor electrode 4, which is an aggregate of fine particles 3, has a very large surface area. Also, a monomolecular layer of dye is formed on the surface of the transparent semiconductor electrode 4. It is possible for the surface of the transparent semiconductor electrode 4 to have a fractal shape having a self-similarity like a resin-like structure. A counter electrode 5 comprises a glass substrate 7 and a conductive film 6 formed on that surface of the glass substrate 7 which faces the semiconductor electrode 4. A gel electrolyte 10 is held in the pores of the semiconductor electrode 4 and is interposed between the semiconductor electrode 4 and the conductive film 6. In the photosensitized solar cell of the particular construction, light 12 incident on the glass substrate 1 is absorbed by the dye adsorbed on the surface of the n-type semiconductor electrode 4. Then, the dye delivers the electron to the n-type semiconductor electrode 4 and, at the same time, dye delivers the hole to the gel electrolyte 10, thereby performing the photovoltaic function.

EXAMPLES 2 TO 5

A dye-sensitized solar cell substantially equal in construction to the solar cell in Example 1 was prepared substantially as in Example 1, except that the metal halides shown in Table 1 were used in place of $MgI_2$.

EXAMPLE 6

An electrolyte was prepared by dissolving 0.03M of iodine in 1-methyl-3-propyl imidazolium iodide. Then, an electrolytic composition was obtained by adding 0.2 g of tetramethyl ammonium salt of polyacrylic acid and 0.1 g of $ZnCl_2$ to 10 g of the electrolyte thus prepared.

A dye-sensitized solar cell was prepared as in Example 1, except that the electrolytic composition prepared as above was used for preparing the dye-sensitized solar cell.

EXAMPLES 7 TO 10

A dye-sensitized solar cell substantially equal in construction to the solar cell in Example 6 was prepared substantially as in Example 6, except that the metal halides shown in Table 1 were used in place of $ZnCl_2$.

EXAMPLE 11

An electrolyte was prepared by dissolving 0.03M of iodine in 1-methyl-3-propyl imidazolium iodide. Then, an electrolytic composition was obtained by adding 0.2 g of tetrapropyl ammonium salt of polystyrene sulfonic acid and 0.1 g of $CaCl_2$ to 10 g of the electrolyte thus prepared.

A dye-sensitized solar cell was prepared as in Example 1, except that the electrolytic composition prepared as above was used for preparing the dye-sensitized solar cell.

EXAMPLES 12 AND 13

A dye-sensitized solar cell substantially equal in construction to the solar cell in Example 11 was prepared substantially as in Example 11, except that the metal halides shown in Table 1 were used in place of $CaCl_2$.

EXAMPLE 14

An electrolyte was prepared by dissolving 0.03M of iodine in 1-methyl-3-propyl imidazolium iodide. Then, an electrolytic composition was obtained by adding 0.2 g of tetramethyl ammonium salt of polymethacrylic acid and 0.1 g of $MgCl_2$ to 10 g of the electrolyte thus prepared.

A dye-sensitized solar cell was prepared as in Example 1, except that the electrolytic composition prepared as above was used for preparing the dye-sensitized solar cell.

EXAMPLE 15

An electrolyte was prepared by dissolving 0.03M of iodine in 1-methyl-3-propyl imidazolium iodide. Then, an electrolytic composition was obtained by adding 0.2 g of tetraethyl ammonium salt of polymethacrylic acid and 0.1 g of $SrBr_2$ to 10 g of the electrolyte thus prepared.

A dye-sensitized solar cell was prepared as in Example 1, except that the electrolytic composition prepared as above was used for preparing the dye-sensitized solar cell.

EXAMPLE 16

An electrolyte was prepared by dissolving 0.03M of iodine in 1-methyl-3-propyl imidazolium iodide. Then, an electrolytic composition was obtained by adding 0.2 g of tetrapropyl ammonium salt of polymethacrylic acid and 0.1 g of $BaI_2$ to 10 g of the electrolyte thus prepared.

A dye-sensitized solar cell was prepared as in Example 1, except that the electrolytic composition prepared as above was used for preparing the dye-sensitized solar cell.

EXAMPLE 17

An electrolyte was prepared by dissolving 0.03M of iodine in 1-methyl-3-propyl imidazolium iodide. Then, an electrolytic composition was obtained by adding 0.2 g of tetrahexyl ammonium salt of polymethacrylic acid and 0.1 g of $MgCl_2$ to 10 g of the electrolyte thus prepared.

A dye-sensitized solar cell was prepared as in Example 1, except that the electrolytic composition prepared as above was used for preparing the dye-sensitized solar cell.

EXAMPLE 18

An electrolyte was prepared by dissolving 0.03M of iodine in 1-methyl-3-propyl imidazolium iodide. Then, an electrolytic composition was obtained by adding 0.2 g of tetraethyl ammonium salt of polyvinyl benzene sulfonic acid and 0.1 g of $ZnI_2$ to 10 g of the electrolyte thus prepared.

A dye-sensitized solar cell was prepared as in Example 1, except that the electrolytic composition prepared as above was used for preparing the dye-sensitized solar cell.

EXAMPLE 19

An electrolyte was prepared by dissolving 0.03M of iodine in 1-methyl-3-propyl imidazolium iodide. Then, an electrolytic composition was obtained by adding 0.2 g of tetraethyl ammonium salt of polyvinyl benzoic acid and 0.1 g of $CaBr_2$ to 10 g of the electrolyte thus prepared.

A dye-sensitized solar cell was prepared as in Example 1, except that the electrolytic composition prepared as above was used for preparing the dye-sensitized solar cell.

EXAMPLE 20

An electrolyte was prepared by dissolving 0.5M of tetrapropyl ammonium iodide, 0.02M of potassium iodide and 0.09M of iodine in 1-methyl-3-propyl imidazolium iodide. Then, an electrolytic composition was obtained by adding 0.2 g of ammonium salt of polymethacrylic acid and 0.1 g of $MgI_2$ to 10 g of the electrolyte thus prepared. The ammonium salt of polymethacrylic acid was obtained by allowing tributyl ammonium hydroxide to react with polymethacrylic acid, and has a weight average molecular weight of 10,000.

A dye-sensitized solar cell was prepared as in Example 1, except that the electrolytic composition prepared as above was used for preparing the dye-sensitized solar cell.

EXAMPLE 21

An electrolyte was prepared by dissolving 0.5M of tetrapropyl ammonium iodide, 0.02M of potassium iodide and 0.09M of iodine in 1-methyl-3-propyl imidazolium iodide. Then, an electrolytic composition was obtained by adding 0.2 g of ammonium salt of polymethacrylic acid and 0.1 g of $MgI_2$ to 10 g of the electrolyte thus prepared. The ammonium salt of polymethacrylic acid was obtained by allowing dihexyl ammonium hydroxide to react with polymethacrylic acid, and has a weight average molecular weight of 10,000.

A dye-sensitized solar cell was prepared as in Example 1, except that the electrolytic composition prepared as above was used for preparing the dye-sensitized solar cell.

EXAMPLE 22

An electrolyte was prepared by dissolving 0.5M of tetrapropyl ammonium iodide, 0.02M of potassium iodide and 0.09M of iodine in 1-methyl-3-propyl imidazolium iodide. Then, an electrolytic composition was obtained by adding 0.2 g of ammonium salt of polymethacrylic acid and 0.1 g of $MgI_2$ to 10 g of the electrolyte thus prepared. The ammonium salt of polymethacrylic acid was obtained by allowing hexyl ammonium hydroxide to react with polymethacrylic acid, and has a weight average molecular weight of 10,000.

A dye-sensitized solar cell was prepared as in Example 1, except that the electrolytic composition prepared as above was used for preparing the dye-sensitized solar cell.

EXAMPLE 23

An electrolyte was prepared by dissolving 0.5M of tetrapropyl ammonium iodide, 0.02M of potassium iodide and 0.09M of iodine in 1-methyl-3-propyl imidazolium iodide. Then, an electrolytic composition was obtained by adding 0.2 g of ammonium salt of polymethacrylic acid and 0.1 g of $MgI_2$ to 10 g of the electrolyte thus prepared. The ammonium salt of polymethacrylic acid was obtained by allowing ammonium hydroxide to react with polymethacrylic acid, and has a weight average molecular weight of 10,000.

A dye-sensitized solar cell was prepared as in Example 1, except that the electrolytic composition prepared as above was used for preparing the dye-sensitized solar cell.

EXAMPLE 24

An electrolyte was prepared by dissolving 0.03M of iodine in 1-methyl-3-propyl imidazolium iodide. Then, an electrolytic composition was obtained by adding 0.2 g of ammonium salt and 0.1 g of $CaCl_2$ to 10 g of the electrolyte thus prepared. The ammonium salt was obtained by allowing tributyl ammonium hydroxide to react with polystyrene sulfonic acid, and has a weight average molecular weight of 10,000.

A dye-sensitized solar cell was prepared as in Example 1, except that the electrolytic composition prepared as above was used for preparing the dye-sensitized solar cell.

COMPARATIVE EXAMPLE 1

An electrolytic composition was prepared by dissolving 0.2 g of polyacrylonitrile, which is a compound bringing about a self-organization, in 10 g of the electrolyte similar to that prepared in Example 1.

The electrolytic composition thus prepared was poured into a photovoltaic unit similar to that described previously in conjunction with Example 1 so as to permit the electrolytic composition to permeate the n-type semiconductor electrode and, at the same time, to be poured into the clearance between the n-type semiconductor electrode and the tin oxide electrode (conductive film).

Then, the open portion of the photovoltaic unit was sealed with an epoxy resin, and the sealed portion was subjected to a heat treatment at 50° C. for 200 minutes by using a hot plate so as to obtain a photovoltaic unit, i.e., a dye-sensitized solar cell.

COMPARATIVE EXAMPLE 2

An electrolyte was prepared by dissolving 0.5M of lithium iodide and 0.05M of iodine in propylene carbonate, followed by dissolving 10% by weight (10 g) of poly(4-vinyl pyridine) having a weight average molecular weight of 2,000 in 90% by weight of the electrolyte thus prepared. Then, an electrolytic composition was obtained by dissolving 10 g of 1,6-dibromohexane in the resultant solution.

A dye-sensitized solar cell was prepared as in Example 1, except that the electrolytic composition prepared as above was used for preparing the dye-sensitized solar cell.

The solar cell obtained in each of Examples 1 to 24 and Comparative Examples 1 and 2 was decomposed so as to look into the state of the electrolyte. The electrolyte was found to have been gelled.

The composition of the gelling agent contained in the solar cell for each of Examples 1 to 5 was examined. The gelling agent used in Examples 1 to 5 was found to be a mixture containing of a polymer in which polymethacrylic acid molecules were crosslinked by the metal ion of $Mg^{2+}$, $Zn^{2+}$, $Al^{3+}$, $Ga^{3+}$ or $Ge^{4+}$ and another polymer in which molecules of tetrabutyl ammonium salt of polymethacrylic acid were crosslinked by the metal ion of $Mg^{2+}$, $Zn^{2+}$, $Al^{3+}$, $Ga^{3+}$ or $Ge^{4+}$.

Also, the composition of the gelling agent contained in the solar cell for each of Examples 6 to 10 was examined. The gelling agent used in Examples 6 to 10 was found to be a mixture containing of a polymer in which polyacrylic acid molecules were crosslinked by the metal ion of $Zn^{2+}$, $Ca^{2+}$, $B^{3+}$, $Si^{4+}$ or $P^{3+}$ and another polymer in which molecules of tetrabutyl ammonium salt of polyacrylic acid were crosslinked by the metal ion of $Zn^{2+}$, $Ca^{2+}$, $B^{3+}$, $Si^{4+}$ or $P^{3+}$.

Further, the composition of the gelling agent contained in the solar cell for each of Examples 11 to 13 was examined. The gelling agent used in Examples 11 to 13 was found to be a mixture containing of a polymer in which polystyrene sulfonic acid molecules were crosslinked by the metal ion of $Ca^{2+}$, $Sc^{3+}$ or $Ti^{4+}$ and another polymer in which molecules of tetrapropyl ammonium salt of polystyrene sulfonic acid were crosslinked by the metal ion of $Ca^{2+}$, $Sc^{3+}$ or $Ti^{4+}$.

Also, measured was the energy conversion efficiency in the case of irradiating the solar cell for each of Examples 1 to 24 and Comparative Examples 1 and 2 with a quasi-solar light having an intensity of 100 mW/cm², with the results as shown in Tables 1 and 2. Then, the solar cell for each of Examples 1 to 24 and Comparative Examples 1 and 2 was stored for a month under the temperature of 100° C., followed by obtaining the energy conversion efficiency in the case of irradiating the solar cell with a quasi-solar light having an intensity of 100 mW/cm². The reduction rate of the energy conversion efficiency was obtained by comparing the energy conversion efficiency after storage of the solar cell with that before storage of the solar cell. Tables 1 and 2 also show the results.

Incidentally, Tables 1 and 2 also show the specific hydrocarbon groups represented by R in —$COONR_4$ contained in the quatertiary ammonium salt of polycarboxylic acid and the specific hydrocarbon groups represented by R in —$SO_3NR_4$ contained in the quatertiary ammonium salt of polysulfonic acid as well as the weight average molecular weight of the quatertiary ammonium salt of polycarboxylic acid and the weight average molecular weight of the quatertiary ammonium salt of polysulfonic acid.

TABLE 1

| Examples | Ammonium salts | Kind of R in $COONR_4$ or $SO_3NR_4$ | Weight average molecular weight of ammonium salt | Metal halide | Energy conversion efficiency (%) | (Durability) reduction rate (%) |
|---|---|---|---|---|---|---|
| 1 | tetrabutyl ammonium salt of polymethacrylic acid | —$C_4H_9$ | 50,000 | $MgI_2$ | 9 | 3 |
| 2 | tetrabutyl ammonium salt of polymethacrylic acid | —$C_4H_9$ | 50,000 | $ZnI_2$ | 8 | 3 |

TABLE 1-continued

| Examples | Ammonium salts | Kind of R in COONR$_4$ or SO$_3$NR$_4$ | Weight average molecular weight of ammonium salt | Metal halide | Energy conversion efficiency (%) | (Durability) reduction rate (%) |
|---|---|---|---|---|---|---|
| 3 | tetrabutyl ammonium salt of polymethacrylic acid | —C$_4$H$_9$ | 50,000 | AlI$_3$ | 7 | 5 |
| 4 | tetrabutyl ammonium salt of polymethacrylic acid | —C$_4$H$_9$ | 50,000 | GaI$_3$ | 7 | 5 |
| 5 | tetrabutyl ammonium salt of polymethacrylic acid | —C$_4$H$_9$ | 50,000 | GeI$_4$ | 8 | 5 |
| 6 | tetramethyl ammonium salt of polyacrylic acid | —CH$_3$ | 10,000 | ZnCl$_2$ | 9 | 3 |
| 7 | tetramethyl ammonium salt of polyacrylic acid | —CH$_3$ | 10,000 | CaI$_2$ | 7 | 4 |
| 8 | tetramethyl ammonium salt of polyacrylic acid | —CH$_3$ | 10,000 | BCl$_3$ | 7 | 5 |
| 9 | tetramethyl ammonium salt of polyacrylic acid | —CH$_3$ | 10,000 | SiI$_4$ | 7 | 5 |
| 10 | tetramethyl ammonium salt of polyacrylic acid | —CH$_3$ | 10,000 | PCl$_3$ | 7 | 5 |
| 11 | tetrapropyl ammonium salt of polystyrene sulfonic acid | —C$_3$H$_7$ | 10,000 | CaCl$_2$ | 8 | 4 |
| 12 | tetrapropyl ammonium salt of polystyrene sulfonic acid | —C$_3$H$_7$ | 10,000 | ScBr$_3$ | 6 | 6 |
| 13 | tetrapropyl ammonium salt of polystyrene sulfonic acid | —C$_3$H$_7$ | 10,000 | TiBr$_4$ | 7 | 4 |

TABLE 2

| | Ammonium salts | Kind of R in COONR$_4$ or SO$_3$NR$_4$ | Weight average molecular weight of ammonium salt | Metal halide | Energy conversion efficiency (%) | (Durability) reduction rate (%) |
|---|---|---|---|---|---|---|
| Example 14 | tetramethyl ammonium salt of polymethacrylic acid | —CH$_3$ | 50,000 | MgCl$_2$ | 8 | 3 |
| Example 15 | tetraethyl ammonium salt of polymethacrylic acid | —C$_2$H$_5$ | 50,000 | SrBr$_2$ | 8 | 5 |
| Example 16 | tetrapropyl ammonium salt of polymethacrylic acid | —C$_3$H$_7$ | 50,000 | BaI$_2$ | 8 | 5 |
| Example 17 | tetrahexyl ammonium salt of polymethacrylic acid | —C$_6$H$_{13}$ | 50,000 | MgCl$_2$ | 9 | 3 |
| Example 18 | tetraethyl ammonium salt of polyvinyl benzene sulfonic acid | —C$_2$H$_5$ | 50,000 | ZnI$_2$ | 9 | 3 |
| Example 19 | tetraethyl ammonium salt of polyvinyl benzoic acid | —C$_2$H$_5$ | 50,000 | CaBr$_2$ | 8 | 4 |
| Example 20 | tributyl ammonium salt of polymethacrylic acid | H, —C$_4$H$_9$ | 10,000 | MgI$_2$ | 6 | 5 |
| Example 21 | dihexyl ammonium salt of polymethacrylic acid | H, —C$_6$H$_{13}$ | 10,000 | MgI$_2$ | 6 | 6 |
| Example 22 | hexyl ammonium salt of polymethacrylic acid | H, —C$_6$H$_{13}$ | 10,000 | MgI$_2$ | 6 | 6 |
| Example 23 | ammonium salt of polymethacrylic acid | H | 10,000 | MgI$_2$ | 5 | 7 |
| Example 24 | tributyl ammonium salt of polystyrene sulfonic acid | H, —C$_4$H$_9$ | 10,000 | CaCl$_2$ | 5 | 8 |
| Comparative Example 1 | polyacrylonitrile | — | — | — | 4 | 30 |
| Comparative Example 2 | both polyvinyl pyridine and dibromohexane | — | — | — | 4 | 15 |

As apparent from Tables 1 and 2, the solar cell for each of Examples 1 to 24 exhibits a high energy conversion efficiency, and is low in the reduction rate of the energy conversion efficiency caused by the temperature elevation so as to be excellent in the durability, compared with the solar cell for each of Comparative Examples 1 and 2.

It should be noted that, in the solar cell for Example 1, the R bonded to the nitrogen atom in the ammonium salt is a hydrocarbon group. In the solar cell for each of Examples 20 to 23, however, the R substituents bonded to the nitrogen atom in the ammonium salt include a hydrogen atom. As apparent from Tables 1 and 2, the solar cell for Example 1 exhibits a high energy conversion efficiency and is low in the reduction of the energy conversion efficiency after storage under 100° C., compared with the solar cell for each of Examples 20 to 23.

Particularly, the solar cell for each of Examples 1, 2, 6, 14, 17 and 18, in which a magnesium halide or a zinc halide is used in combination with a tetraalkyl ammonium salt, permits increasing the energy conversion efficiency to 8 to 9% and also permits suppressing the reduction rate of the energy conversion efficiency after storage under 100° C.

EXAMPLE 25

A slurry was prepared by adding 0.2 g of tetrabutyl ammonium salt of polymethacrylic acid having a weight average molecular weight of 5,000 to 10 g of the electrolyte equal to that described previously in conjunction with Example 1.

methacrylic acid having both a carboxyl group (—COOH) and a —COON($C_4H_9$)$_4$ group, in which the number of substituents —COON($C_4H_9$)$_4$ was set as shown in Table 4 below on the basis that the sum of the functional groups —COOH and —COON($C_4H_9$)$_4$ was set at 100%.

The energy conversion efficiency and the reduction rate of the energy conversion efficiency were measured as in Example 1 in respect of the solar cell for each of Examples 1a to 1c. Table 4 shows the results. The result for Example 1 is also shown in Table 4.

TABLE 4

| | | Number of substituents COON($C_4H_9$)$_4$ (%) | Energy conversion efficiency (%) | (Durability) Reduction rate (%) |
| --- | --- | --- | --- | --- |
| Example 1 | tetrabutyl ammonium salt of polymethacrylic acid | 100% | 8 | 3 |
| Example 1a | tetrabutyl ammonium salt of polymethacrylic acid | 70% | 7.8 | 3.4 |
| Example 1b | tetrabutyl ammonium salt of polymethacrylic acid | 30% | 7.6 | 3.8 |
| Example 1c | tetrabutyl ammonium salt of polymethacrylic acid | 20% | 7 | 5 |

EXAMPLE 26

A slurry was prepared by adding 0.2 g of tetrabutyl ammonium salt of polymethacrylic acid having a weight average molecular weight of 250,000 to 10 g of the electrolyte equal to that described previously in conjunction with Example 1.

Table 3 shows the viscosity of the slurry for Example 26, with the viscosity of the slurry for Example 25 being set at 1. As shown in Table 3, the viscosity of the electrolyte-containing slurry for Example 25 was about one third of the viscosity of the electrolyte-containing slurry for Example 26. The experimental data clearly support that the electrolyte-containing slurry for Example 25 is advantageous in that the electrolytic composition can be promptly permeated into a cell.

TABLE 3

| Example | Ammonium Salt | Weight average molecular weight | Viscosity |
| --- | --- | --- | --- |
| 25 | tetrabutyl ammonium salt of polymethacrylic acid | 5,000 | 1 |
| 26 | tetrabutyl ammonium salt of polymethacrylic acid | 250,000 | 3 |

Example 1a

A dye-sensitized solar cell was prepared as in Example 1, except that used was tetrabutyl ammonium salt of polymethacrylic acid having both a carboxyl group (—COOH) and a —COON($C_4H_9$)$_4$ group, in which the number of substituents —COON($C_4H_9$)$_4$ was set at 70% on the basis that the sum of the functional groups —COOH and —COON($C_4H_9$)$_4$ was set at 100%.

Examples 1b to 1c

A dye-sensitized solar cell was prepared as in Example 1, except that used was tetrabutyl ammonium salt of poly- As apparent from Table 4, the solar cell for each of Examples 1, 1a and 1b in which the number of substituents —COON($C_4H_9$)$_4$ is not smaller than 30% exhibited an energy conversion efficiency higher than that of the solar cell for Example 1c. And, the reduction rate of the energy conversion efficiency after storage of the solar cell at 100° C. was low for the solar cell for each of Examples 1, 1a and 1b. Incidentally, the solar cell for each of Examples 1a and 1b was decomposed so as to examine the composition of the gelling agent contained in the gel electrolyte. The gelling agent for each of Examples 1a and 1b was found to be a mixture consisting of a polymer in which the polymethacrylic acid molecules were crosslinked by the magnesium ion ($Mg^{2+}$) and another polymer in which the molecules of the tetrabutyl ammonium salt of polymethacrylic acid were crosslinked by a magnesium ion ($Mg^{2+}$).

EXAMPLE 27

A paste was produced by adding nitric acid to a high purity titanium oxide (anatase) powder having an average primary particle diameter of 30 nm, kneading those together with pure water, and stabilizing a resulting material by a surfactant. The paste was printed on a dense portion formed on a glass substrate by screen printing and then heat-treated at 450° C., whereby a 2-μm thick n-type semiconductor electrode layer containing a titanium oxide (anatase) was formed. By repeating the screen printing and the heat treatment plural times, an 8-μm thick n-type semiconductor electrode 4 containing anatase-phase titanium oxide 3 was formed finally on a fluoride-doped tin oxide conductive film 2 as a transparent conductive film. The n-type semiconductor electrode 4 had a roughness factor of 1,500. The roughness factor was determined from a nitrogen absorption amount for a projection area of the substrate.

The substrate was immersed for 4 hours in a dried ethanol solution (temperature: about 80° C.) of $3 \times 10^{-4}$ mol of [cis-bis(anato)-N,N-bis(2,2'-dipyridyl-4,4'-dicarboxylic)-ruthenium (II) dihydrate] and then lifted in an argon flow, whereby a ruthenium complex as a dye was carried by the surface of the n-type semiconductor electrode 4.

A counter electrode 5 containing a glass substrate 7 on which platinum-added, fluorine-doped tin oxide electrode 6 was placed on the above substrate 1 formed with the n-type semiconductor electrode 4 by using spacers having a diameter of 15 μm, and the two substrates were fixed to each other by applying an epoxy resin 8 to a peripheral portion except an electrolyte liquid inlet. A cross sectional view of the resultant photovoltaic unit thus prepared was similar to portion (a) in FIG. 1 described previously.

In the next step, an electrolyte was prepared by dissolving 0.5M of tetrapropyl ammonium iodide, 0.02M of potassium iodide and 0.09M of iodine in 1-methyl-3-poropyl imidazolium iodide. Then, 0.2 g of polyvinyl pyridine having a weight average molecular weight of 50,000 and 0.1 g of $MgI_2$ were added to 10 g of the electrolyte thus prepared so as to obtain an electrolytic composition.

As shown in portion (b) and (c) in FIG. 1, the electrolytic composition 10 was poured into the photovoltaic unit through the pouring port 9 so as to allow the electrolytic composition 10 to permeate the n-type semiconductor electrode 4 and to be poured into the clearance between the n-type semiconductor electrode 4 and the tin oxide electrode (conductive film) 6.

Then, the open portion of the photovoltaic unit was sealed with an epoxy resin 11, followed by heating the sealed portion at 60° C. for 30 minutes by using a hot plate so as to manufacture a photovoltaic element, i.e., a dye-sensitized solar cell. A cross sectional view of the construction of the solar cell thus manufactured was similar to FIG. 2 described previously.

EXAMPLES 28 TO 36

Dye-sensitized solar cells each having the construction similar to that of the dye-sensitized solar cell described previously in conjunction with Example 27 were manufactured as in Example 27, except that used were metal halides shown in Table 4 in place of $MgI_2$.

EXAMPLE 37

A dye-sensitized solar cell having the construction similar to that of the dye-sensitized solar cell described previously in conjunction with Example 27 was manufactured as in Example 27, except that used was 1,2,4,5-tetrakis(1-imidazolylmethyl) in place of polyvinyl pyridine.

EXAMPLE 38

A dye-sensitized solar cell having the construction similar to that of the dye-sensitized solar cell described previously in conjunction with Example 27 was manufactured as in Example 27, except that used was 2-(4-pyridyl)ethyl ether in place of polyvinyl pyridine.

EXAMPLE 39

An electrolyte was prepared by dissolving 0.5M of tetrapropyl ammonium iodide, 0.03M of t-butyl pyridine, 0.02M of potassium iodide and 0.09M of iodine in 1-methyl-3-propyl imidazolium iodide. Then, an electrolytic composition was obtained by adding 0.2 g of 1,2,4,5-tetrakis(1-imidazolylmethyl) and 0.1 g of $RuI_3$ to 10 g of the electrolyte thus prepared.

A dye-sensitized solar cell was prepared as in Example 37, except that the electrolytic composition prepared as above was used for preparing the dye-sensitized solar cell.

EXAMPLE 40

A dye-sensitized solar cell having the construction similar to that of the dye-sensitized solar cell described previously in conjunction with Example 27 was manufactured as in Example 27, except that 0.03M of t-butyl pyridine was added to the electrolytic composition.

COMPARATIVE EXAMPLE 3

A dye-sensitized solar cell having the construction similar to that of the dye-sensitized solar cell described previously in conjunction with Example 27 was manufactured as in Example 27, except that $CaBr_2$ was used in place of $MgI_2$.

The solar cell for each of Examples 27 to 40 and Comparative Example 3 was decomposed so as to look into the state of the electrolyte. The electrolyte was found to have been gelled.

Also, the solar cell for each of Examples 27 to 40 and Comparative Example 3 was irradiated with a quasi-solar light having an intensity of 100 mW/cm$^2$ so as to obtain the energy conversion efficiency. Table 5 shows the result. Then, the solar cell for each of Examples 27 to 40 and Comparative Example 3 was stored for a month under the temperature of 100° C., followed by obtaining the energy conversion efficiency in the case of irradiating the solar cell with a quasi-solar light having an intensity of 100 mW/cm$^2$. The reduction rate of the energy conversion efficiency was obtained by comparing the energy conversion efficiency after storage of the solar cell with that before storage of the solar cell. Table 5 also show the results. Incidentally, the results for Comparative Examples 1 and 2 described previously are also shown in Table 5.

Further, the gelling time of the electrolytic composition was measured in respect of the solar cell for each of Examples 27 to 40 and Comparative Examples 1 to 3. Table 4 also shows the relative values of the gelling time with the gelling time for Comparative Example 2 used as a reference.

TABLE 5

|  | Nitrogen-containing heterocyclic compound | Metal compound | Energy conversion efficiency (%) | Reduction rate (%) | Relative comparison of gelling time |
|---|---|---|---|---|---|
| Example 27 | polyvinyl pyridine | $MgI_2$ | 9 | 4 | 2 |
| Example 28 | polyvinyl pyridine | $PtI_4$ | 9 | 4 | 6 |
| Example 29 | polyvinyl pyridine | $RuI_3$ | 9 | 3 | 20 |
| Example 30 | polyvinyl pyridine | $ZnBr_2$ | 7 | 8 | 6 |
| Example 31 | polyvinyl pyridine | $RhI_3$ | 8 | 3 | 15 |
| Example 32 | polyvinyl pyridine | $OsCl_3$ | 7 | 6 | 20 |

TABLE 5-continued

|  | Nitrogen-containing heterocyclic compound | Metal compound | Energy conversion efficiency (%) | Reduction rate (%) | Relative comparison of gelling time |
|---|---|---|---|---|---|
| Example 33 | polyvinyl pyridine | $PdI_2$ | 8 | 3 | 6 |
| Example 34 | polyvinyl pyridine | $ZnI_2$ | 8 | 3 | 6 |
| Example 35 | polyvinyl pyridine | $CuI_2$ | 7 | 4 | 7 |
| Example 36 | polyvinyl pyridine | $FeI_2$ | 7 | 5 | 6 |
| Example 37 | 1,2,4,5-tetrakis (1-imidazolylmethyl) benzene | $RuI_3$ | 8 | 6 | 30 |
| Example 38 | 2-(4-pyridyl) ethyl ether | $RuI_3$ | 8 | 7 | 28 |
| Example 39 | 1,2,4,5-tetrakis (1-imidazolylmethyl) benzene | $RuI_3$ | 8 | 6 | 50 |
| Example 40 | polyvinyl pyridine | $MgI_2$ | 9 | 4 | 10 |
| Comparative Example 1 | polyacrylonitrile | no addition | 4 | 30 | 10 |
| Comparative Example 2 | polyvinyl benzene | 1,6-dibromo hexane | 4 | 15 | 1 |
| Comparative Example 3 | polyvinyl pyridine | $CaBr_2$ | 6 | 6 | 2 |

As apparent from Table 5, the solar cell for each of Examples 27 to 40 exhibits a high energy conversion efficiency, permits suppressing the reduction of the energy conversion efficiency caused by the temperature elevation, and is excellent in durability, compared with the solar cell for each of Comparative Examples 1 to 3. Particularly, the solar cell for each of Examples 27 to 29, in which magnesium iodide, platinum iodide or ruthenium iodide is used as a crosslinking agent, permits increasing the energy conversion rate to 9%, and also permits lowering the reduction rate of the energy conversion efficiency caused by the storing under a high temperature of 100° C. to 3 to 4%.

Table 5 also shows that the solar cell for each of Examples 29, 31, 32, 37 and 38, in which a ruthenium halide, a rhodium halide or an osmium halide is used as the crosslinking agent, permits increasing the relative gelling time of the electrolytic composition to 15 or more.

Further, the gelling time in the solar cell for each of Examples 39 and 40, in which t-butyl pyridine was added, was found to be further longer than that in the solar cell for Examples 27 and 37, in which t-butyl pyridine was not added. The long gelling time for each of Examples 39 and 40 is considered to be brought about by the mechanism described below. Specifically, $MgI_2$ and t-butyl pyridine once forms a complex in a molten salt. Since the complex forming reaction is an equilibrium reaction, a part of the complex between $MgI_2$ and t-butyl pyridine, which is in an equilibrium state, releases a free $MgI_2$ if polyvinyl pyridine is added to the complex. The released $MgI_2$ reacts with polyvinyl pyridine so as to proceed the gelling. It follows that the gelling reaction between polyvinyl pyridine and $MgI_2$ proceeds only when the free $MgI_2$ is released to the system so as to retard the gelling time.

EXAMPLE 41

A dye-sensitized solar cell was prepared as in Example 27, except that poly(2-vinyl pyridine) having a chemical structure as shown in chemical formula given below was used in place of polyvinyl pyridine:

poly(2-vinyl pyridine)

Incidentally, poly(2-vinyl pyridine) was found to have a weight average molecular weight of 50,000.

EXAMPLE 42

A dye-sensitized solar cell was prepared as in Example 27, except that compound "e" referred to previously, i.e., poly(4-vinyl-2,2'-bipyridyl), was used in place of polyvinyl pyridine. Incidentally, poly(4-vinyl-2,2'-bipyridyl) was found to have a weight average molecular weight of 20,000.

Also, the solar cell for each of Examples 41 to 42 was irradiated with a quasi-solar light having an intensity of 100 mW/cm² so as to obtain the energy conversion efficiency. Table 6 shows the result. Then, the solar cell for each of Examples 41 to 42 was stored for a month under the temperature of 100° C., followed by obtaining the energy conversion efficiency in the case of irradiating the solar cell with a quasi-solar light having an intensity of 100 mW/cm². The reduction rate of the energy conversion efficiency was obtained by comparing the energy conversion efficiency after storage of the solar cell with that before storage of the solar cell. Table 6 also show the results. Incidentally, the results for Example 27 described previously are also shown in Table 6.

Further, the gelling time of the electrolytic composition was measured in respect of the solar cell for each of Examples 41 to 42. Table 6 also shows the relative values of the gelling time with the gelling time for Comparative Example 2 used as a reference.

TABLE 6

|  | Nitrogen-containing heterocyclic compound | Metal compound | Energy conversion efficiency (%) | Reduction rate (%) | Relative comparison of gelling time |
|---|---|---|---|---|---|
| Example 27 | polyvinyl pyridine | $MgI_2$ | 9 | 4 | 2 |
| Example 41 | poly (2-vinyl pyridine) Weight average molecular weight is 50,000 | $MgI_2$ | 9 | 4 | 10 |
| Example 42 | poly (4-vinyl-2,2'-bipyridyl) Weight average molecular weight is 20,000 | $MgI_2$ | 9 | 3 | 4 |

As apparent from Table 6, the gelling time of the solar cell for Example 41 was found to be longer than that for Example 27. It is considered reasonable to understand that the long gelling time of the solar cell for Example 41 is caused by the mechanism given below. Specifically, in poly(2-vinyl pyridine), the nitrogen atom that reacts with the halogenated metal is positioned close to the backbone chain. On the other hand, in poly(4-vinyl pyridine), the nitrogen atom that reacts with the halogenated metal is positioned in the site remotest from the backbone chain as shown in chemical formula given below:

poly(4-vinyl pyridine)

Such being the situation, it is considered reasonable to understand that the crosslinking reaction of poly(2-vinyl pyridine) can be retarded by the steric effect, compared with the crosslinking reaction of poly(4-vinyl pyridine). As a result, the gelling time can be prolonged in the solar cell for Example 41 so as to make it possible to permit the gel electrolyte to permeate even fine portions when the reaction area of the cell is enlarged.

Table 6 also shows that the solar cell for Example 42 has a gelling time longer than that of the solar cell for Example 27 and, at the same time, has a high durability. It is considered reasonable to understand that the prominent effects produced by the solar cell for Example 42 are derived from the high coordinating power of the 2,2'-pyridyl group of compound "e" to the metal. To be more specific, it is considered reasonable to understand that, since the coordinating power of 2,2'-pydiryl group is higher than that of the pyridine group, the gel electrolyte has a high stability in the solar cell for Example 42 and, thus, the phase transition is unlikely to be brought about by the temperature elevation of the gel electrolyte in the solar cell for Example 42.

In each of the Examples described above, the solar cell is constructed such that the sunlight is incident on the n-type semiconductor electrode. However, it is also possible to apply the technical idea of the present invention to a solar cell constructed such that the sunlight is incident on the counter electrode.

As described above in detail, the present invention provides a raw material kit for an electrolytic composition that permits a dye-sensitized solar cell to exhibit a high energy conversion efficiency. The present invention also provides an electrolytic composition that permits a dye-sensitized solar cell to exhibit a high energy conversion efficiency. Further, the present invention provides a dye-sensitized solar cell that exhibits a high energy conversion efficiency.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dye-sensitized solar cell, comprising:
    an n-type semiconductor electrode containing a dye;
    a counter electrode; and
    a gel electrolyte arranged between said n-type semiconductor electrode and said counter electrode, said gel electrolyte consisting essentially of a gelling agent and an electrolyte, the electrolyte containing iodine, a quatemary ammonium salt represented by formula (1) given below and at least one iodide selected from the group consisting of an iodide of an alkali metal, an iodide of an organic compound and a molten salt of an iodide, and said gelling agent being a metal salt obtained by crosslinking a quaternary ammonium salt of polycarboxylic acid having a $COONR_4$ group with an iodide of a metal having a valency of not less than two;

$$R_4NI \qquad (1)$$

wherein each R is independently an alkyl group, a substituted alkyl group, a substituted aryl group, a fused aryl group, a substituted heterocyclic group, or a fused heterocyclic group.

2. The dye-sensitized solar cell according to claim 1, wherein the valency falls within a range of from 2 (divalent) to 4 (tetravalent).

3. The dye-sensitized solar cell according to claim 1, wherein the iodide of the metal having a valency of not less than two is at least one compound selected from the group consisting of $ZnI_2$, $MgI_2$, $AlI_3$, $GaI_3$, $SiI_4$, and $GeI_4$.

4. The dye-sensitized solar cell according to claim 1, wherein the quaternary ammonium salt of polycarboxylic acid is at least one compound selected from the group consisting of tetramethyl ammonium salt of polymethacrylic acid, tetramethyl ammonium salt of polyacrylic acid, trimethylphenyl ammonium salt of polyacrylic acid, trimethylbenzyl ammonium salt of polyacrylic acid, tetraethyl ammonium salt of polymethacrylic acid, tetrapropyl ammonium salt of polymethacrylic acid, tetrabutyl ammonium salt of polymethacrylie acid, tetrahexyl ammonium salt of polymethacrylic acid, and tetraethyl ammonium salt of polyvinyl benzoic acid.

5. The dye-sensitized solar cell according to claim 1, wherein each of the alkyl group and the substituted alkyl group comprises 1 to 22 carbon atoms, each of the substituted aryl group and the fused aryl group comprises 6 to 22 carbon atoms, and each of the substituted heterocyclic group and the fused heterocyclic group comprises 3 to 22 carbon atoms.

6. The dye-sensitized solar cell according to claim 1, wherein the substituted alkyl group comprises at least one substituent selected from the group consisting of a halogen atom, a cyano group, an alkoxy group, an alkoxy carbonyl group, an aryl group and a heterocyclic group, each of the substituted aryl group and the fused aryl group comprises at least one substituent selected from the group consisting of a halogen atom, a cyano group and an alkyl group, and each of the substituted heterocyclic group and the fused heterocyclic group comprises at least one substituent selected from the group consisting of a halogen atom, a cyano group and an alkyl group.

7. The dye-sensitized solar cell according to claim 1, wherein a weight average molecular weight of the quaternary ammonium salt of polycarboxylic acid falls within a range of 500 to 10,000,000.

8. The dye-sensitized solar cell according to claim 1, wherein the electrolyte further contains an organic solvent.

9. The dye-sensitized solar cell according to claim 1, wherein the electrolyte further contains water.

* * * * *